US008584925B2

(12) United States Patent
Kay et al.

(10) Patent No.: US 8,584,925 B2
(45) Date of Patent: Nov. 19, 2013

(54) SOLDERING PROCESS

(75) Inventors: Lawrence C. Kay, Sherman Oaks, CA (US); Erik J. Severin, Saint Paul, MN (US); Luis A. Aguirre, San Antonio, TX (US)

(73) Assignee: MS2 Technologies, LLC, Los Angeles, CA (US)

( * ) Notice: Subject to any disclaimer, the term of this patent is extended or adjusted under 35 U.S.C. 154(b) by 0 days.

(21) Appl. No.: 13/210,311

(22) Filed: Aug. 15, 2011

(65) Prior Publication Data

US 2011/0296952 A1 Dec. 8, 2011

Related U.S. Application Data

(62) Division of application No. 12/952,962, filed on Nov. 23, 2010, now abandoned, which is a division of application No. 11/108,400, filed on Apr. 18, 2005, now Pat. No. 7,861,915.

(60) Provisional application No. 60/562,964, filed on Apr. 16, 2004.

(51) Int. Cl.
*B23K 31/02* (2006.01)

(52) U.S. Cl.
USPC .......... 228/260; 228/37

(58) Field of Classification Search
USPC .......... 228/37, 260, 256, 34, 40, 214, 233.2, 228/56.1, 56.2; 75/392
See application file for complete search history.

(56) References Cited

U.S. PATENT DOCUMENTS

| | | | | |
|---|---|---|---|---|
| 3,058,441 | A * | 10/1962 | Walker et al. | 228/33 |
| 3,445,919 | A | 5/1969 | Saba | |
| 3,452,916 | A | 7/1969 | Andis | |
| 3,616,984 | A | 11/1971 | Voroba | |
| 3,627,696 | A | 12/1971 | Heithaus et al. | |
| 3,724,416 | A | 4/1973 | Mclain | |
| 3,732,615 | A | 5/1973 | Fitzsimmons | |
| 3,755,886 | A | 9/1973 | Hermann | |
| 3,888,639 | A | 6/1975 | Hastings et al. | |
| 3,915,729 | A * | 10/1975 | Eustice | 106/268 |
| 3,966,110 | A | 6/1976 | Boynton | |
| 3,990,621 | A | 11/1976 | Boynton et al. | |
| 4,092,182 | A | 5/1978 | Arbib et al. | |
| 4,126,673 | A * | 11/1978 | Cromwell | 241/14 |
| 4,171,761 | A | 10/1979 | Boldt et al. | |
| 4,243,440 | A | 1/1981 | Arbib et al. | |
| 4,394,978 | A * | 7/1983 | Weiss | 241/23 |
| 4,441,924 | A | 4/1984 | Arbib et al. | |
| 4,495,007 | A | 1/1985 | Zado | |
| 4,561,913 | A * | 12/1985 | Zado | 148/23 |
| 4,598,858 | A | 7/1986 | Stratil et al. | |
| 5,064,481 | A * | 11/1991 | Davis et al. | 148/23 |
| 5,102,453 | A * | 4/1992 | Yerushalmi | 75/416 |
| 5,124,433 | A * | 6/1992 | Inoue | 528/272 |
| 5,176,307 | A | 1/1993 | Hagerty et al. | |
| 5,568,894 | A * | 10/1996 | Gileta | 228/219 |
| 5,575,863 | A | 11/1996 | Sala et al. | |
| 5,833,921 | A | 11/1998 | Paruchuri et al. | |
| 6,235,208 | B1 * | 5/2001 | Kawashima et al. | 210/767 |
| 6,284,190 | B1 * | 9/2001 | van der Lugt et al. | 266/227 |
| 6,648,216 | B2 | 11/2003 | Yamaguchi et al. | |
| 6,805,282 | B2 | 10/2004 | Kawashima et al. | |
| 2002/0005376 | A1 * | 1/2002 | Tooyama et al. | 209/11 |
| 2003/0136816 | A1 * | 7/2003 | McDonald | 228/203 |
| 2006/0054668 | A1 | 3/2006 | Severin | |

FOREIGN PATENT DOCUMENTS

| | | | |
|---|---|---|---|
| EP | 0938944 | | 1/1999 |
| JP | 52-076250 | A | 6/1977 |
| JP | 10-163617 | A | 6/1998 |
| JP | 2001-068848 | A | 3/2001 |
| JP | 2001-320162 | A | 11/2001 |
| RU | 2116172 | C1 | 7/1998 |
| SU | 408736 | | 11/1973 |

OTHER PUBLICATIONS

Aim, Product Brochure; *Lead-free soldering guide*; 60 pages (2003).
Altera®, Product Brochure; *Reflow soldering guidelines for lead-free packages*; Copyright Jul. 2004, Version 1.0, Application Note 353; 8 pages (2004).
Kester, Product Brochure; *Flux and solder paste considerations for lead-free soldering*; 3 pages, Online article: http://www.kester.com/en-us/leadfree/flux.aspx, Accessed May 19, 2005.

(Continued)

*Primary Examiner* — Scott Kastler
*Assistant Examiner* — Michael Aboagye
(74) *Attorney, Agent, or Firm* — Susan T. Evans; McDermott Will & Emery LLP

(57) ABSTRACT

A process by which molten solder is purified in-situ, making the soldering process more efficient and yielding better results, particularly for lead-free soldering. Lead-free solder becomes practical for use since the temperature for reliable soldering is reduced. A layer of active additive is maintained on the surface of molten solder for scavenging metal oxide from the solder and assimilating metal oxide into a liquid layer. The active additive is an organic liquid having nucleophilic and/or electrophilic groups. As an example, a layer of dimer acid maintained on a wave soldering apparatus scavenges metal oxide from the bath, and assimilates dross that may form on the surface. Scavenging metal oxide cleanses the bath and lowers viscosity of the solder, and PC boards or the like soldered on the wave have reliable solder joints.

13 Claims, 8 Drawing Sheets

(56) References Cited

OTHER PUBLICATIONS

International Search Report for PCT patent application PCT/US2005/013153 mailed Nov. 2, 2005, 4 pages (2005).

Sichuan Institute of Electronics, "Surface mount technology process and materials", published by Surface Mount Technology Professional Council of Sichuan Institute of Electronics, chapter 4, sections 4.8.3-4.8.5, pp. 79-81, with English translation, 3 pages (1999).

Gunstone, "7.11 Dimerization (dimer acids, estolides, isostearic acid, Guerbet alcohols and acids)", *Fatty Acid and Lipid Chemistry*, Aspen Publishers, Inc., Chapman & Hall, New York, p. 200 (1996).

* cited by examiner mN/mm
0.5
0.4
0.3
0.2
0.1
0.0
-0.1
-0.2
-0.3
-0.4
-0.5
SECONDS

FIG. 9

SOLDERING PROCESS

CROSS-REFERENCE TO RELATED APPLICATIONS

This application is a divisional of U.S. patent application Ser. No. 12/952,962 filed Nov. 23, 2010, now abandoned, which is a divisional of U.S. patent application Ser. No. 11/108,400 filed Apr. 18, 2005, now U.S. Pat. No. 7,861,915, issued Jan. 4, 2011, and claims the benefit of priority of U.S. Provisional Application No. 60/562,964 filed Apr. 16, 2004, each of which is incorporated herein by reference in its entirety.

FIELD

This invention addresses the important issue of purity or cleanliness of a solder bath. It has been discovered that scavenging metal oxide from molten solder is of great importance in producing reliable and reproducible solder joints. This is of particular importance when using lead-free solder alloys. An active additive layer on the surface of the bath is used to scavenge and assimilate metal oxide. This has the surprising result of reliable lead-free solder joints produced at a temperature no more than the 260° C. limit for electronic components.

BACKGROUND

Electronic components are commonly soldered to printed circuit (PC) boards with a lead-tin solder. A maximum soldering temperature of 260° C. (500° F.) has become a standard in the industry and this limit has propagated to many other parameters. For example, most components to be soldered to printed circuit boards are rated for a maximum temperature of 260° C. Continuous soldering apparatus is built to operate at a maximum temperature of about 260° C. Even the printed circuit (PC) boards (sometimes called printed wiring boards, PWB) are generally constructed for a maximum soldering temperature of about 260° C.

There is a desire to eliminate hazardous lead from solder, and there are even moves afoot to ban the use of lead. Lead-free solder will be required in many products which now use lead-tin solder. Exemplary substitute lead-free solder alloys include tin-silver and tin-silver-copper alloys having about 95-96.5% tin and 3.5-5% silver. (There is a eutectic at 3.5% silver in the binary Ag—Sn phase diagram.) Copper is often in the range of about 0.3 to 1%. Some tin based solders have been proposed with additions of antimony, bismuth, indium, nickel and/or zinc. Tin is the base for the lead-free solder alloys and is typically present as more than 90% of the alloy.

Soldering processes have been developed which make automatic soldering of PC boards highly reliable. Plated-through holes are filled, ample solder fillets are almost always found, and bridging between closely spaced connector points is rare. To achieve similar reliability with lead-free solders such as tin-silver solder alloys, it is generally found that soldering temperatures of 270 to 275° C. (520° F. or higher) are necessary. Clearly this is higher than the conventional 260° C. limit and has the potential for damaging components. Therefore, reducing the temperature for soldering with such lead-free substitute alloys is highly desirable, particularly in view of the coming requirement for use of lead-free solder.

Another issue which is of concern with respect to both the lead-tin solders and substitute solder alloys is accumulations of dross on the solder. Dross is an accumulation of oxides of the metals in the solder. It can form a solid crust on the molten solder as it accumulates during operation of soldering apparatus. Sometimes it is appropriate to shut down continuous operating apparatus and manually ladle dross from the solder bath. Even when not shut down, manual removal of dross from the surface of the hot solder is practiced. Substantial amounts of solder can be lost into the dross, which then needs to be processed to recover and recycle the metal. Even when dross is not visible, a small amount on the surface of the molten solder can lead to bridging of solder between closely spaced leads and/or failure to wet surfaces to be soldered, so that incomplete or poor joints are obtained.

Due to study of this invention, we are now confident that purity of the solder bath is an important factor in difficulty with soldering. It appears that metal oxide distributed in the bath interferes with wetting and successful soldering. The oxide may raise solder viscosity, provide nucleation sites for crystallization at higher temperatures than solidification in absence of such oxides, and may cause weakness in solder joints. Thus, in addition to visible dross on the surface, a significant issue is purity of the molten solder bath.

It is found in practice of this invention that formation of dross in continuous soldering apparatus can be significantly minimized or even eliminated by durable additives. Most surprising, the temperature at which viable soldering takes place with lead-free solder alloys has been reduced by as much as 30° F. (16 to 17° C.). Soldering temperature for tin-silver alloys can be brought below the 260° C. limit.

Furthermore, there is a surprising reduction in viscosity of the molten metal in a wave solder apparatus, for example. This may contribute to the excellent solder joints obtained at plated-through holes in PC boards. Such improvements in solder joints are also due to better wetting as shown by wetting balance tests. Cleanliness of the solder bath is believed responsible.

A variety of wave soldering, fountain soldering and cascade soldering systems which may be used in practice of this invention are described and illustrated in *ASM Handbook, Volume* 6, *Welding, Brazing, and Soldering*. Exemplary apparatus, as illustrated in FIG. 7 which is largely copied from *Metals Handbook*, page 1088, comprises a large vat or "solder pot" in which molten solder 10 may be held at the desired soldering temperature. A pump (not shown) draws solder from near the bottom of this molten mass and forces it upwardly through one or more slot nozzles 11 from which the solder flows laterally like a waterfall, either in one direction or both directions from the slot, and back into the vat. The upper surface of the flowing solder is commonly referred to as a "wave".

When such a wave soldering apparatus is used for soldering, a printed circuit board 12 is moved across the apparatus so that the lower face of the PC board contacts the upper surface of the wave 13 of molten solder. Molten solder wets the surfaces to be soldered, and wicks into the plated-through holes and around leads, and makes good solder joints therebetween. In such automatic apparatus PC boards are fed into the wave in close succession for high capacity production. There are also so-called fountain soldering machines and cascade soldering systems with which this invention is useful.

Sometimes a portion of the solder in wave soldering apparatus overflows into a secondary reservoir and molten solder returns from the reservoir to the larger solder pot. Dross forming on the solder due to oxidation upon exposure to air also overflows and accumulates in the secondary reservoir, from which it may be removed. Some dross also may flow along the surface of the wave. There is appreciable turbulence where such "waterfalls" of molten solder meet the surface of the solder bath, providing surfaces where metal oxides or dross may form. The deleterious effects of such phenomena are ameliorated by this invention.

In practice of this invention, a sufficiently extensive liquid active additive layer is maintained on the molten solder bath during the soldering process for maintaining purity or cleanliness of the bath. The layer provides the surprising result of significantly lowering the temperature at which reliable solder joints are obtained. The liquid layer preferably comprises a material that is stable at the temperature of the bath, effectively bars oxygen in air from reaching a quiescent surface of the bath, and has the ability to assimilate oxide of at least one metal in the bath and remain liquid for a commercially acceptable time. Typically, the material comprises an organic molecule with nuleophilic and/or electrophilic end groups. Carboxylic —COOH end groups are particularly preferred.

An exemplary substance comprises a dimer acid such as described in greater detail hereinafter. A dimer acid has previously been used as a cover or oxygen barrier material on the surface of a bath of molten metal as lead and tin are melted together to formulate a lead-tin solder alloy. Minor amounts of dimer acid have been formulated into soldering flux compositions.

SUMMARY

In an embodiment of practice of this invention, a liquid layer of active additive for scavenging and assimilating metal oxide is introduced onto a solder bath, and a surface to be soldered is contacted with the molten solder. The invention comprises scavenging metal oxide from a bath of molten metal. Furthermore, the invention comprises assimilating oxidized metal in an active additive.

BRIEF DESCRIPTION OF THE FIGURES

FIGS. 8 and 9 are metallographic cross sections of solder joints.

DETAILED DESCRIPTION

This invention comprises a process by which molten solder is purified in-situ, making the soldering process more efficient and yielding better results, particularly for lead-free soldering. Lead-free solder becomes practical for use since the temperature for reliable soldering is reduced.

In a preferred embodiment of practice of this invention, a liquid active additive layer is maintained on a molten solder bath during a soldering process for maintaining purity or cleanliness of the bath. The active additive comprises a material that scavenges metal oxide from the molten metal, that is stable at the temperature of the bath, that effectively bars oxygen in air from reaching a quiescent surface of the bath, and has the ability to assimilate oxide of at least one metal in the bath. The active additive should remain liquid for a commercially acceptable time. Typically, the material comprises an organic molecule with nucleophilic and/or electrophilic end groups. Carboxylic end groups, such as in a dimer acid, are particularly preferred.

Although the active additive is stated to be stable at the temperature of the bath, this does not mean that it is stable for an infinitely long time. As described hereinafter, even a "stable" additive gradually degrades, oxidizes and/or becomes loaded with assimilated metal to the extent that it is viscous or gummy after a period of exposure to the harsh conditions of a molten solder bath. On the other hand, a material that vaporized rapidly, smoked badly or quickly degraded and became solid, would not be considered stable.

The description commences with an outline of an easily understood example of a soldering process with details and variations, as appropriate, added later. Wave soldering is convenient as a way of describing the subject matter.

Thus, in its simplest form, an active additive is added to the molten solder in a wave soldering apparatus. The active additive is an organic liquid of lower density than solder and quickly spreads across at least the exposed quiescent surface of the molten solder bath. Metal oxide dross formation decreases and already formed dross on the surface is collected in a darkening liquid that appears to include active additive and assimilated metal oxide. Metal oxides in the molten solder are promptly scavenged when the active additive is added to the bath. The resulting cleansed or purified solder bath has lowered viscosity, and surprisingly, allows reliable solder joints to be formed at lower temperatures than previously believed feasible with conventional lead-free solder. Although not measured, it is believed that the cleansed molten metal wets solid surfaces to be soldered more effectively than does metal which still contains metal oxides.

Figure 7:
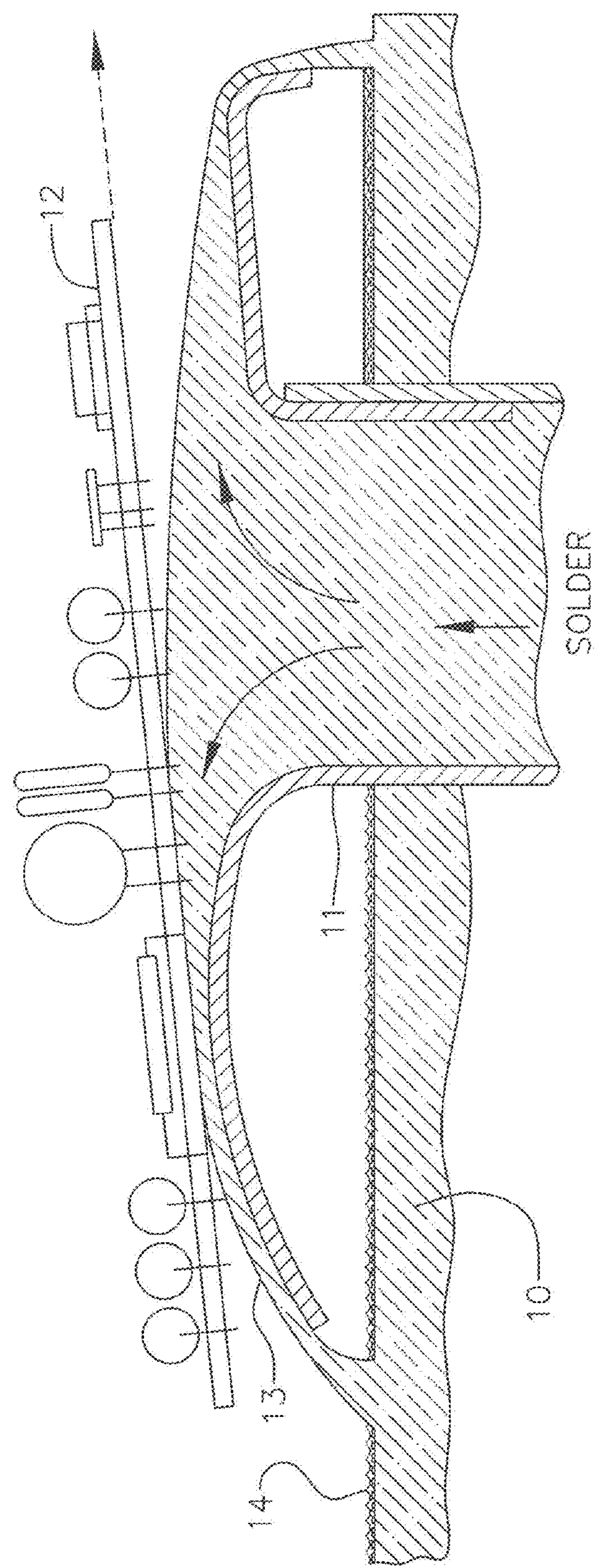
FIG. 7 illustrates semi-schematically and in partial transverse cross section, an exemplary soldering apparatus which may be used in practice of this invention.

Sufficient active additive is put onto the bath of molten solder to form a layer across the exposed quiescent surface of solder in the pot in apparatus such as illustrated in FIG. 7. Preferably a sufficient amount of the active additive is added to provide a layer on the quiescent surface of the bath that will last at least a full shift of a work day, or at least four hours so that maintenance is not required more often than that. A printed circuit board (or other object to be soldered) is brought into contact with at least a surface of the molten solder so that solder wets metal surfaces on the board and components, and flows to fill plated-through holes, secure electrical leads, cover contact pads, etc. In a wave soldering apparatus, the PC board contacts the top of the wave of molten solder pumped from near the bottom of the bath. Additive may not be present on the dynamic surface of the wave or in a turbulent area where the wave falls into the bath, but the active additive enhances soldering by scavenging metal oxide from the main volume of the bath.

Preferably, the amount of additive is sufficient to promptly assimilate metal oxide from the surface of the bath. Preferably one forms a layer with a thickness of as much as three millimeters, or even more, on at least a portion of the surface of the molten solder. Such a thick layer is desirable since it can remain effective at least four hours and ordinarily at least a full day before the bath should be cleaned. A thinner layer may be suitable when the apparatus is operated for shorter periods. One might, for example, form a relatively thinner layer initially and later add additional material to form a thicker layer. Or a thinner layer might be used and skimmed and replenished more often. Preferably, enough additive is used to maintain a liquid layer which has assimilated metal oxide rather than allowing solid-appearing dross to accumulate on the surface.

Other conventional aspects of the soldering process need not be described, such as, for example: application of flux to the PC board before soldering, use of a hot air knife or the like for removing excess solder, or any desired prior or subsequent cleaning considered desirable for such a PC board. Examples of soldering other objects besides PC boards need not be described.

Residues of additive do not appear to remain on PC boards to which solder has been applied from a bath on which dimer acid, for example, has been added. Benign solvents for cleaning any such residues exist, such as iso-propyl alcohol and aqueous solutions containing surfactants, for example. Toluene is effective for dissolving and removing dimer acid, which is a presently preferred active additive.

A dimer acid is a high molecular weight di-carboxylic acid which is liquid (typically viscous at room temperature), stable and resistant to high temperatures. It is produced by dimerization of unsaturated or saturated fatty acids at mid-molecule and often contains 36 carbons. (For example, a trimer acid which contains three carboxyl groups and 54 carbons is analogous. A trimer of shorter fatty acid chains with about 36 total carbons would be equivalent.) Fatty acids are composed of a chain of aliphatic groups containing from 4 to as many as 30 carbon atoms (although commercially useful fatty acids have up to 22 carbon atoms) and characterized by a terminal carboxyl group, —COOH. The generic formula for all carboxylic acids above acetic acid is $CH_3(CH_2)_xCOOH$. The carbon atom count includes the —COOH group.

Fatty acids may be saturated or unsaturated. In some cases there may be dimers of mixed saturated and unsaturated fatty acids. Exemplary saturated fatty acids include palmitic acid (C16) and stearic acid (C18). Unsaturated fatty acids are usually vegetable-derived and comprise aliphatic chains usually containing 16, 18 or 20 carbon atoms with the characteristic end group —COOH. Among the most common unsaturated acids are oleic acid, linoleic acid and linolenic acid, all C18. Saturated fatty acids are preferred in practice of this invention. They are more stable at elevated temperature than unsaturated fatty acids with appreciable double bonds. Aromatic fatty acids are also known, for example phenyl-stearic, abietic acid and other fatty acids derived from rosin. Rosin acids comprise C20 monomers and may contain a phenanthrene ring (e.g. abietic and pimaric acids). Dimers containing phenyl rings are quite acceptable when the rings are linked (if more than one is in a molecule) solely at one corner so that the molecule has "flexibility". Phenyl rings are effectively flat and may stack to form a monomolecular film on molten solder. The aromatic dimer acids may also be more thermally stable than similar carbon number aliphatic dimer acids.

The dimers (and higher oligomers) of fatty acids may be dimers of like fatty acids or copolymers of different fatty acids. This can be seen from the mass spectrometer analysis of composition of one commercial grade of "dimer acid" found useful in practice of this invention. As set forth in Tables I to III, the "dimer acid" was found to be about 89% dimer, about 6% monomer (fatty acids) and 5% trimer acid.

The commercially available monomeric fatty acids used to make dimers can vary appreciably depending on the source of raw materials. The proportions of different acids present differs as between coconut oil, peanut oil, palm oil, olive oil, corn oil, safflower oil, tung oil, rapeseed oil, tall oil, distilled tall oil, oils from marine sources, etc. Such oils may be blended for still further variations.

The dimerized molecules may have considerable variation due to source of fatty acid and/or polymerizing parameters. For example, one might consider a dimer as an X-shaped structure of four aliphatic chains with primary hetero atoms or reactive end groups on one or more of the chains. There may be various lengths of all four chains depending on where the source materials linked. The typical two —COOH end groups on a dimer acid may be on the ends of adjacent chains or on the ends of opposite chains. The hetero atoms at the ends of chains may be the same or different, and although two is typical, there may be one or more active end groups on individual molecules.

Instead of a neat X such as might be found in an 8,9-substituted C18 alkane, the side chains on a C18 chain might not be directly opposite, but may be found at essentially any location along such a chain. (For example, side chains might be at positions 3 and 12, or 3 and 9, or almost any other combination.) The hetero atoms may be essentially along the length of such a chain instead of at the end of a carbon chain. Also, not all molecules in a mixture need to be the same and probably never are.

Thus, a broad variety of dimers, trimers and higher polymers can be made depending on the raw material monomers and the polymerization conditions and/or catalyst. For example, just one manufacturer of commercial "dimer acids" offers about two dozen different grades, and there are numerous manufacturers annually producing about 235 million pounds of such products. Many of these dimer acids include varying proportions of monomer, dimer and trimer. Most are made from tall oil feedstocks, but other fatty acid sources are also prevalent.

Commercially available dimer acids may have mixed dimers, i.e., dimers where the two fatty acids are different from each other, and there may be mixes of saturated and unsaturated fatty acids which are dimerized. Since dimerization occurs at a site of unsaturation, starting with unsaturated fatty acids may result in the preferred saturated dimers.

Exemplary commercially available dimer acids and trimer acids include AVER13, AVER17, AVER18 and AVER19 available from Aver Chemical, Yuanda Group of Yichun City, JiangXi Province, China; Century 1156, Unidyme 11, Unidyme 14, Unidyme 14R, Unidyme 18, Unidyme 22, Unidyme 27, Unidyme 35, Unidyme 40, Unidyme 60, Unidyme M-9, Unidyme M-15, Unidyme M-35, Unidyme T-17, Unidyme T-18, and Unidyme T-22 available from Arizona Chemical Company of Dover, Ohio and Picayune, Miss.; Empol 1008, Empol 1018, Empol 1022, Empol 1040 and Empol 1062 available from Cognis Group of Cincinnati, Ohio and Kankakee, Ill.; MeadWestvaco DTC 155, DTC 175, DTC 180, DTC 195, DTC 275, DTC 295, DTC 595, and SCTO available from MeadWestvaco of Stamford, Conn.; a dimer acid identified as PM200 which is 80 to 90% dimer acid, 10 to 20% trimer acid and a maximum of 5% monomer acid available from Samwoo Oil Chemical Co of Yangjugun, KYE, Korea; products from Resolution Performance Products, Lakeland, Fla.; Pripol 1006, Pripol 1009, Pripol 1013, Pripol 1017 and Pripol 2033 available from Uniqema of London, England and Wilmington, Del.; Empol 1010, Empol 1014, Empol 1016, Empol 1018, Empol 1022, Empol 1024, Empol 1040, and Empol 1041 available from Brown Chemical Co. (distributor) of Paterson, N.J.; Pacific Dimer Acid from Pacific Epoxy Polymers, Inc., of Richmond, Mo.; and various dimer acid products from Lianyou Products of Hianjin, China; Kodia Company Limited of Changsha, China; and Zhejiang Yongzai Chemical Industry Co. of Zhejiang, China.

This list is not believed to be comprehensive and other dimer acids and the like may be commercially available from these or other vendors.

In addition to dicarboxylic dimer acids, nucleophilic or electrophilic substitutions for the —COOH group, per se, may also be equivalent. Some acceptable end groups might not be considered to be electrophilic or nucleophilic in strictest chemical terms but are still capable of complexing or forming non-covalent (e.g. dative) bonds with metal oxides. For purposes of this application such end groups are considered within the scope of "nucleophilic and/or electrophilic". For example, other additives comprise amines, alcohols, thiols, phosphenes, and amides, as dimers and/or trimers. Other additives may be suitable if they do not disassociate at the temperature of the molten solder bath comprise esters, anhydrides, imides, lactones and lactams. (For example, ERISYS GS-120, a glycidyl ester of linoleic acid dimer, available from Specialty Chemicals Inc. of Moorestown, N.J.)

Thus, the additive may comprise the hydrocarbon moiety of a dimer and/or trimer of fatty acid and at least one nucleophilic or electrophilic group on the hydrocarbon moiety. It is preferable that there are at least two nucleophilic or electrophilic groups and more specifically that the groups are carboxylic.

For practice of this invention, it is considered that dimers and/or trimers of fatty acids having at least eight carbon atoms (C8) can be used. Instead of a dimer of fatty acid with about 18 carbon atoms, a trimer of a lower molecular weight fatty acid may have properties sufficiently similar to a dimer acid to be used as an additive on a solder bath.

The active additive need not always have a hydrocarbon moiety corresponding to a dimer of fatty acid. In other words, an appropriate additive is an organic molecule with a hydrocarbon moiety, and functional group(s) which are nucleophilic or electrophilic to capture tin oxide and/or other oxide of metal in the bath. For example, a long chain hydrocarbon (preferably saturated) split near one end with a side chain and nucleophilic or electrophilic groups on one or both ends of the split is acceptable.

There are properties of the active additive to the solder bath that are important for commercial applications. For example, the additive is liquid at the temperature of molten solder in the bath, and has sufficient stability against oxidation and sufficiently low vapor pressure to remain as an active liquid layer on the bath of molten solder, preferably for at least four hours and even better, a full day. The active additive includes an organic material having one or more nucleophilic and/or electrophilic end groups and has the ability to scavenge and assimilate oxide of at least one metal in the bath and preferably remain effective for at least a full work shift and more preferably about one day. Preferably the layer of active additive effectively bars oxygen in air from reaching the quiescent surface of the solder. It is also desirable that the additive be non-corrosive, non-conductive and non-hydrophilic so that there is no detriment in the event of residue of additive on a PC board or other object soldered, and there is no need for supplemental cleaning.

Since the number of commercially available dimer acids and/or trimer acids and other suitable nucleophilic- and/or electrophilic-group containing molecules is quite large and the number of possibilities within the scope of "active additives" is even larger, there is some probability that there are substances with some of these properties which will not be fully effective as described, and therefore not be suitable for practice of this invention.

For example, a dictionary definition of fatty acid goes down to 4 carbon atoms in the monomer. A dimer of this material would probably be inappropriate for any of a number of reasons. For example, it may have a vapor pressure that is too high (or boiling point that is too low), so that it could not be used on a molten solder bath; it may have a flash point that is too low for use on a solder bath at 260° C.; etc. A higher oligomer of such short chain fatty acids, might, however, be suitable. Failure to have some of the properties mentioned above may readily eliminate some candidate materials.

Fortunately, there is a quick, easy and inexpensive test for screening a candidate active additive material to avoid those that are unsuitable. Clearly, one skilled in the art can eliminate some substances by simply knowing some of the physical properties, such as viscosity, vapor pressure, boiling point, flash point, oxidation stability, etc., (some materials may be unacceptably smoky or give off other fumes, for example). Some candidate substances may remain, where it is uncertain whether they will work well. Those can be found by a screening test. Furthermore, there may be substances that pass the screening test and do in fact work, but are not commercially practical because of the need to operate for longer periods of time at high temperature. Some materials degrade more rapidly than others and may not be deemed commercially usable, although operable.

The screening test is simple. Solder flow is started in an apparatus such as a wave soldering apparatus and the flow of solder observed. A small amount of the candidate substance is added onto the solder bath. When a candidate substance is operable, there is a prompt visually discernable change in the flow characteristics of the solder. The solder in a "waterfall" over a weir or through a slot appears more fluid, as if there is a reduction in viscosity. Irregularities in the surface of the wave diminish. Dross on the surface of the solder seems to collect in one or a few regions of sludge, with other areas of the surface of the solder previously containing floating dross becoming shiny and clean. Solid dross may disappear as it is assimilated by the liquid additive. The changes might be quantified, but that is not necessary for screening. Only a small amount of material needs to be added, i.e., 50 to 100 milliliters or less in a typical small wave soldering apparatus to produce a visually discernable change and to obtain good soldering characteristics from the bath. Larger amounts may be added for evaluating longer term stability of the additive on the molten solder bath. An exemplary use further characterizing the screening test is described hereinafter.

A surprising result of adding an active additive to the surface of a solder bath in wave soldering apparatus is an almost immediate reduction in viscosity of the molten metal. When the active additive is poured onto a bath without active additive, and maybe with some visible dross, the height of the wave promptly increases. In wave soldering apparatus, the metal that flows into the wave is drawn from near the bottom of the solder bath, so the floating active additive liquid is not part of the solder passing through the pump. Without change in pump pressure, there is a quite noticeable change in wave height. A wave previously grazing the bottom of PC boards passed over the wave in automatic apparatus, may rise enough to now overflow the top of a board, for example. Pump pressure may, therefore, be reduced or the boards passed at a slightly higher elevation.

There appears to be solubility or at least dispersion of metal oxide in molten metal, such as dispersion of tin oxide in tin. (The solubility of oxygen in tin, for example, is very low.) It only takes a small amount of metal oxide to change the rheology of molten metal. Even a small concentration of high melting point materials in the molten metal may raise the viscosity of the metal. (This has been suggested to occur in lead-tin solder alloys.) An active additive layer added to a molten solder bath appears to scavenge and assimilate at least some of the metal oxide dispersed in the molten solder, thereby purifying or cleansing the solder, and lowering the viscosity of the molten metal. This could explain the visually discernable change in the flow characteristics in a wave soldering apparatus upon addition of an active additive, as well as the improved wetting by solder on components being soldered.

In an exemplary situation, a layer of oxide dross was allowed to accumulate on the surface of solder in a small commercial wave soldering apparatus operated for three eight hour shifts. The solder pot had a surface area of about 10 by 14 inches (25×35 cm) including the area of the wave. About ⅓ or more of the surface was "quiescent" in that it was not in the flowing wave. About 150 to 200 ml of a dimer acid active additive was added to the apparatus and formed a layer that appeared to be about 3-4 mm thick. Floating dross was largely assimilated into the liquid layer within about a half minute.

Surprisingly, after two or three minutes, viscosity of the liquid metal pumped into the wave appeared to be decreased since the wave height was noticeably increased as compared with wave height before the active additive layer was formed. This is regarded as evidence that metal oxide is being scavenged from the molten metal. The apparatus was operated with PC boards passed across the wave and soldered for another 24 hours. It is estimated that about 500 PC boards were soldered while the active layer was maintained on the bath. The layer was then dark (rather like chocolate) and gummy, but still effective for assimilating metal oxide. The volume of the layer had increased about 50 to 100% from its original thickness. It is believed that a significant part of the change in the layer is due to thermal degradation of the active additive material.

Thus, an aspect of this process is reducing viscosity and improving purity of a solder bath by adding a stable liquid active additive with nucleophilic and/or electrophilic end group(s) that scavenge oxides from the molten solder. A preferred nucleophilic end group is —COOH. By reducing viscosity by cleansing or purifying the bath of metal oxides, lower soldering temperatures can be used. Further, metal oxide is assimilated in the liquid active additive layer. It is of particular significance that scavenging metal oxide from the bath of molten metal enhances wetting of solid (e.g. copper) surfaces to be soldered.

One surprising aspect of this invention is that the temperature at which reliable soldering takes place with lead-free solder alloys such as tin-silver and tin-silver base alloys has been reduced to no more than 260° C. Thus, the soldering process comprises contacting a PC board or the like to be soldered with molten solder at a temperature of up to 260° C. This occurs when an active additive has been applied to the surface of the molten solder. Comparable joint soldering reliability from a bath without the active additive requires a temperature higher than 260° C.

Figure 1:
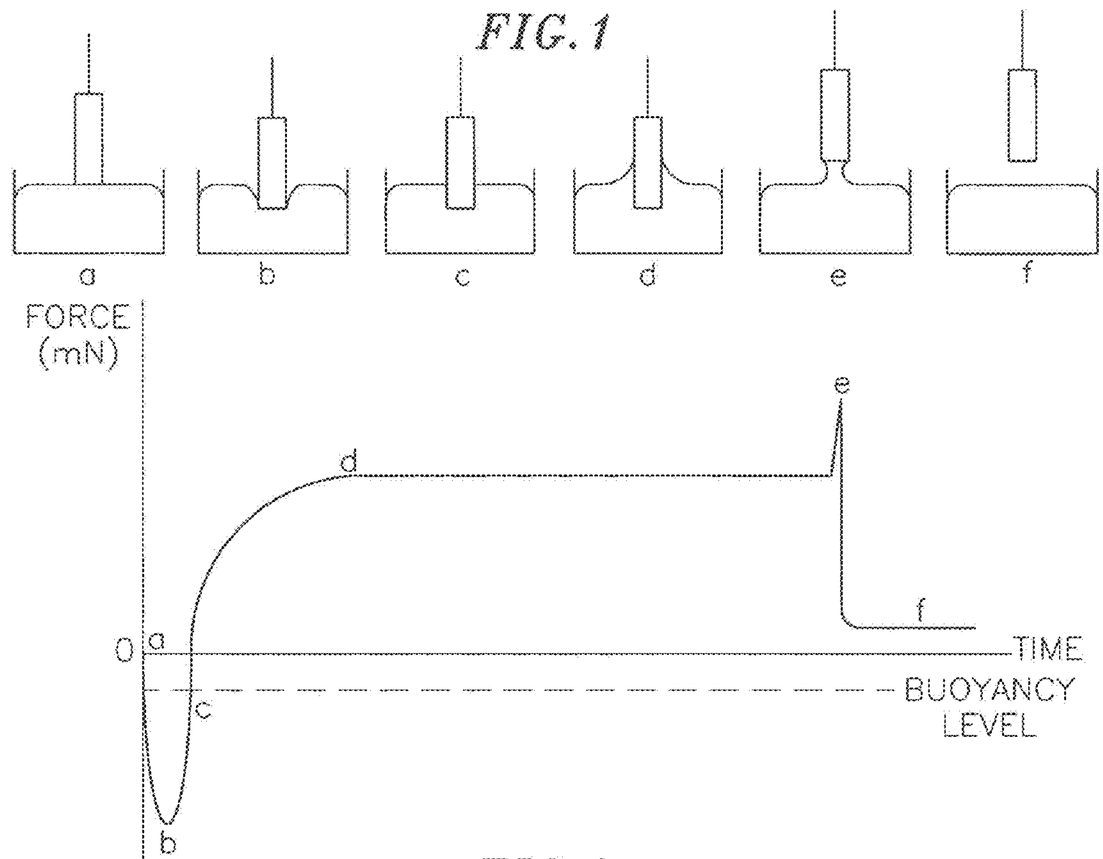
FIG. 1 illustrates the steps of lowering and raising a test coupon in a wetting balance test and a plot of force versus time during such a wetting balance test.

Wetting balance tests show the effectiveness of an active additive which scavenges oxides from the metal on wetting of lead-free solder on copper. In a wetting balance test, a test coupon is lowered into molten solder and allowed to wet the metal surface before withdrawing the coupon from the bath. FIG. 1 illustrates the steps of lowering and raising the coupon and a plot of force versus time during such a test. Point a corresponds to the moment the sample reaches the surface of the solder bath. Point b is at the end of immersion of the sample in the solder and indicates the Archimedean push due to density differences between the sample and the solder. Point c is when the buoyancy force is at equilibrium, i.e., when there is no force applied by the wetting balance apparatus. Point d illustrates the maximum force as a sample is wetted by solder. Point e is a spike of force as the sample is lifted out of the solder bath. Line f shows the force or weight of the sample out of the solder bath at the end of the test.

Figure 2:
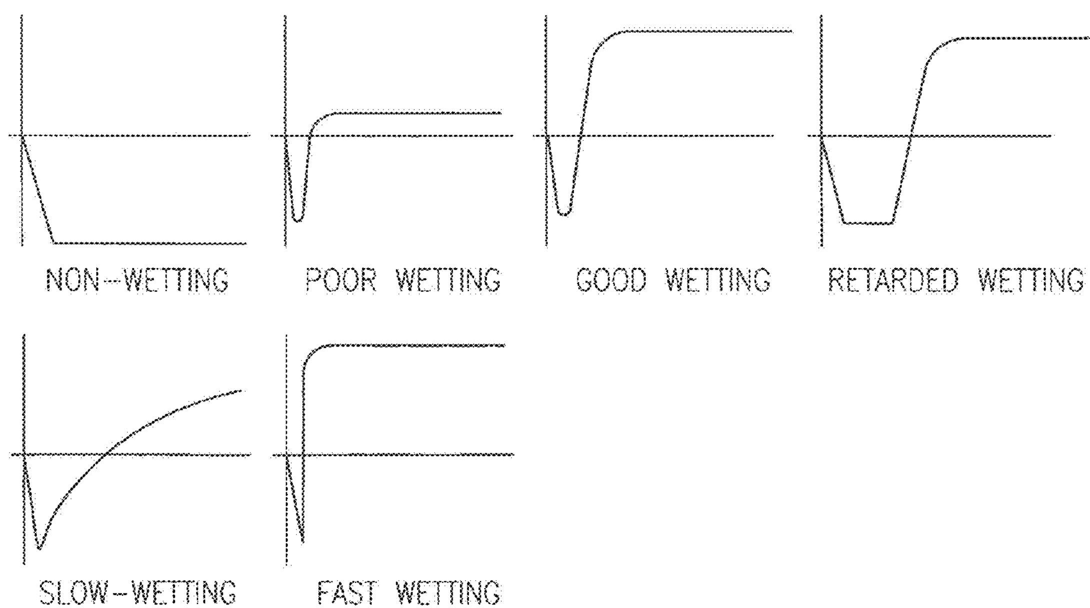
FIG. 2 illustrates schematically the types of wetting curves one may see in such wetting balance tests.

FIG. 2 illustrates schematically some types of wetting curves one may see in such tests. The nature of the wetting performance is indicated for each schematic graph.

In the tests described herein, the wetting balance apparatus was a "Must II" model from Concoat. About ten pounds (about 4.5 kg.) of SAC 305 alloy was in a pot with a surface area of about 48 square inches (310 sq cm). This alloy has 3% silver, 0.5% copper and balance tin. Test coupons were like pieces of PC board with copper on one face. A test coupon is ½ inch (1.27 cm) wide and was immersed in the solder one inch (2.54 cm). All test coupons were "fresh" with a conventional OSP (oxygen solder protection) sealer on the surface. The OSP sealer inhibits oxidation of the copper before soldering. Shortly before immersion, Type R flux was applied on the copper surface. (Type R flux is a conventional flux, about 25% by weight water-white gum rosin and balance isopropyl alcohol. It evaporates or "burns off" rapidly at soldering temperatures.) The solder in the pot was quiescent (i.e., there was no flow). Before a sample coupon was immersed, a flat blade was used to push visible dross and/or additive away from the area where the coupon was to be immersed.

Figure 3:
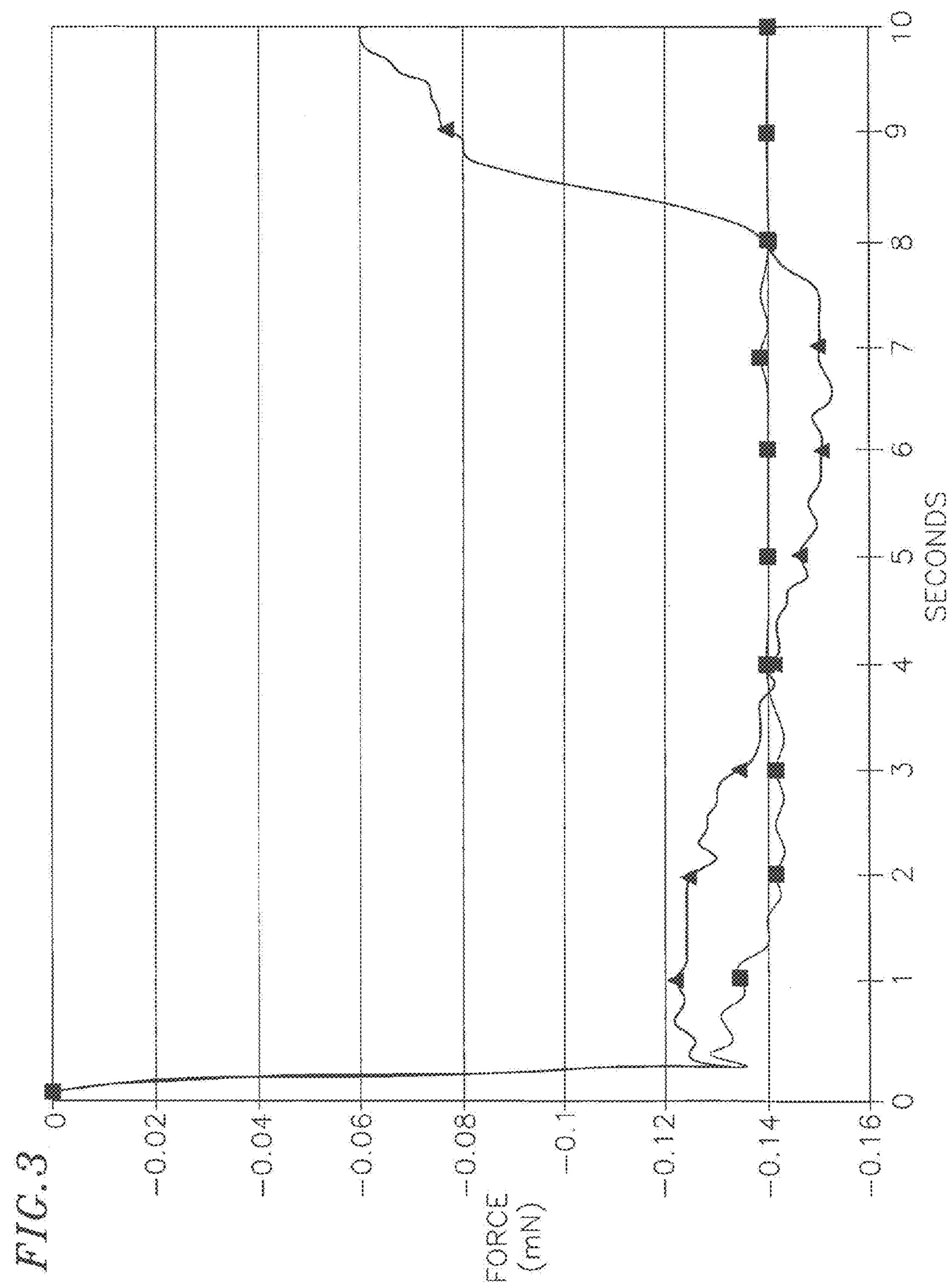
FIG. 3 is a graph of force versus time from wetting balance tests.

In a pair of tests, coupons were immersed in SAC 305 alloy solder at 235° C., and in neither case was there any wetting after eight seconds in the solder pot. FIG. 3 is a graph of force versus time from these tests. One coupon had slight wetting after about eight seconds. In effect, this was non-wetting. (235° C. is a typical temperature for solder reflow with conventional lead-tin solder alloy.)

Figure 4:
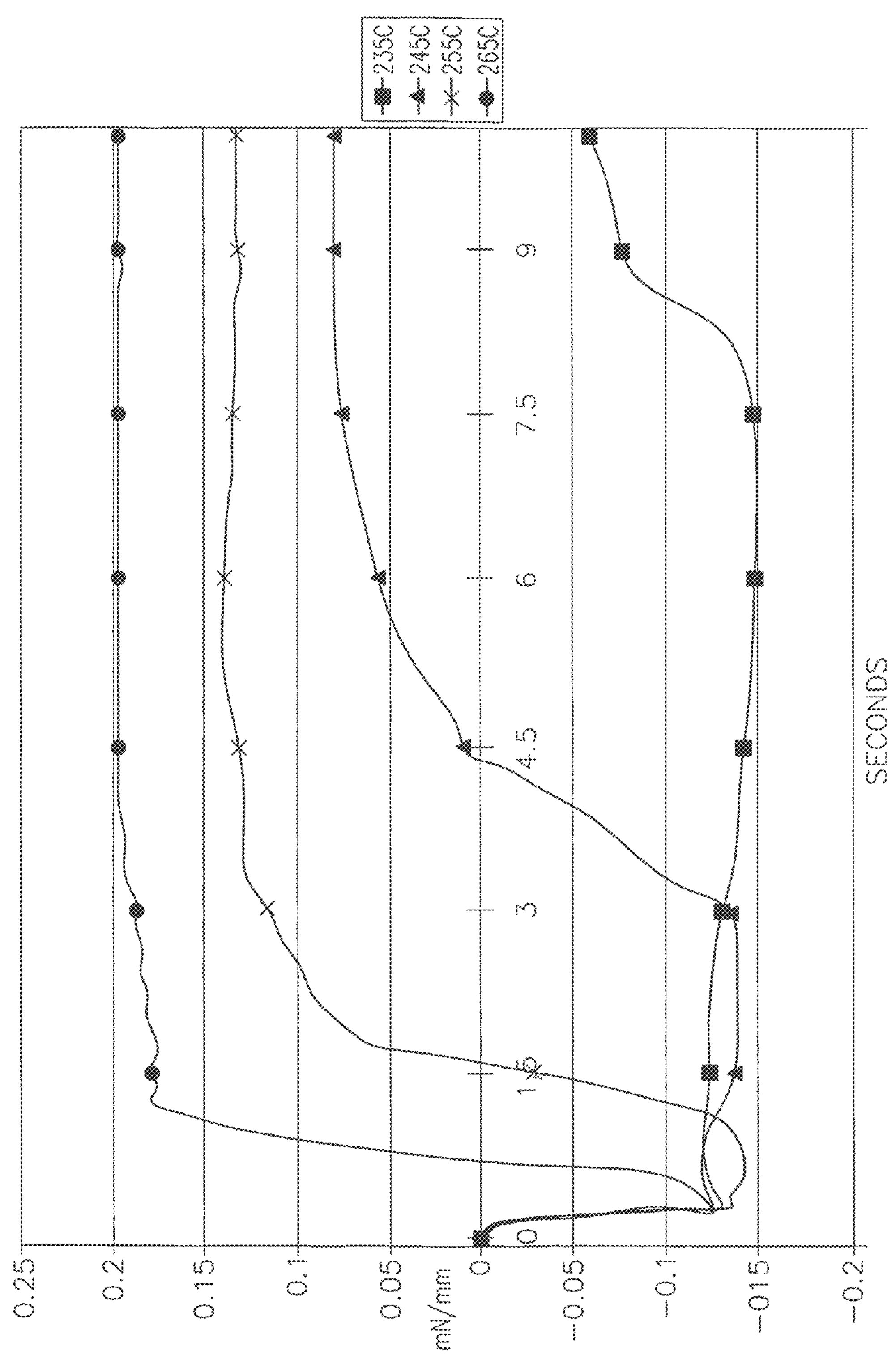
FIG. 4 is a graph of force versus time for wetting balance tests at a series of temperatures.

Coupons were also immersed at 245, 255 and 265° C., respectively, and those tests are illustrated the graph of FIG. 4. The coupon immersed at 245° showed retarded poor wetting (after about four seconds). The coupon at 255° showed slow poor wetting (after about 1.5 seconds). The coupon at 265° showed good wetting (at less than ¾ second). There was no additive on the bath during these tests.

Figure 5:
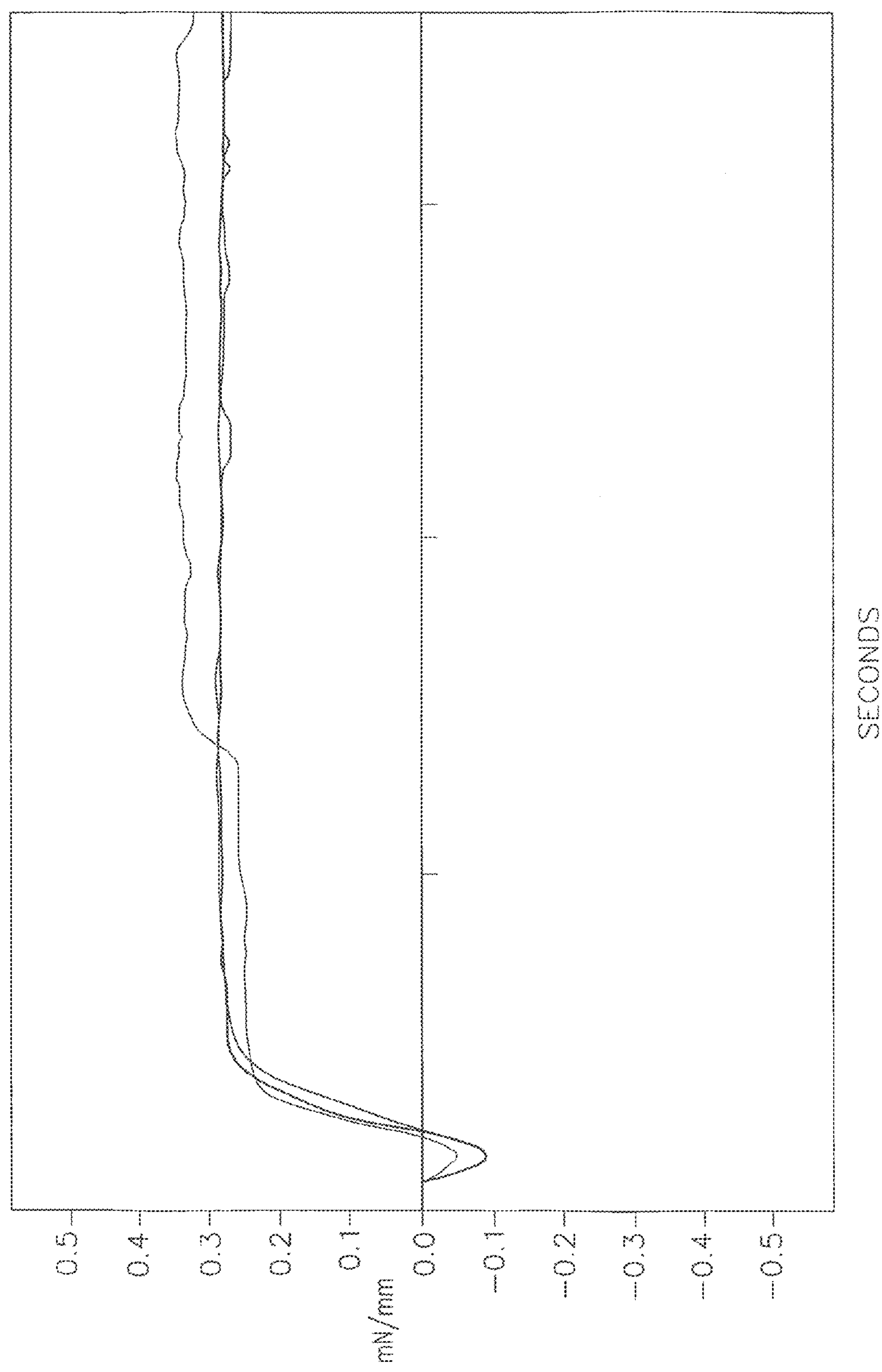
FIG. 5 is a graph of force versus time for wetting balance tests illustrating practice of this invention.

About two fluid ounces (about 60 ml) of dimer acid was added to the solder pot and allowed to spread to the edges. When pushed away with a blade, about ⅓ of the surface of the molten solder had a layer of dimer acid with a thickness estimated as about ¼ inch (about 6 mm). No visible dimer acid was in the region where the coupons were immersed. There was no visible dross on the surface. Three test coupons were immersed and in each test there was good wetting at 235° C. FIG. 5 is a graph illustrating these results. Each sample reached the zero force axis at about 0.3 seconds and was fully wetted in no more than ¾ second. (It may be noted that in a typical wave soldering process, a PC board is in contact with molten solder in the wave for about two seconds or even as much as four seconds.)

After dimer acid was apparently cleaned from the pot and dross was allowed to form, coupons showed significantly retarded wetting at 235° C. There was no wetting before about two seconds on any of three coupons. Reasonable wetting was found after about four seconds.

Remarkably, the appearance of a solder joint surface is changed by floating a layer of active additive on the surface of the solder bath in wave soldering apparatus or the like. A good quality conventional solder joint of lead-tin alloy has a smooth shiny surface, and operators doing soldering rely on that appearance to assess whether there are good joints. The surface of a lead-free solder such as a tin-silver-copper alloy is typically rather rough looking or grainy, even when an acceptable joint has been produced. There may also be what seem to be flow lines or patches of ordered irregularities on the surface. These are subjective observations of the joint appearance which are not quantified, but are apparent to an experienced operator either with the naked eye or with small magnification.

It has been found that the surface of a lead-free solder joint formed from a melt where active additive is present on the surface of a solder pot generally has the smooth (non-textured) shiny appearance of a conventional lead-tin solder joint. Such smooth surface can be seen on the top and bottom of a joint. When a PC board is soldered in a wave soldering apparatus, the “bottom” of the board is brought into contact with the top of the wave of solder. Molten solder flows through a plated-through hole in the board and along a lead in the hole to form a joint that extends through to the “top” of the board. When such a solder joint is made without use of active additive on the wave solder apparatus, there may be a subtle difference in the appearance of the joint on the top and bottom surfaces. The surface on the bottom appears smoother and the surface on the top of the joint appears rougher. However, when active additive is used on the solder bath, the top and bottom surfaces are quite similar in appearance and generally smooth and shiny.

Furthermore, the metallographic appearance of such a lead-free solder differs depending on whether active additive is used or not used.

A tin-silver alloy solder includes a eutectic so that upon solidification from a melt there is a two phase structure; a basically tin phase and a silver rich phase (probably an intermetallic compound). Copper and other additional alloying elements may be present in low enough amounts to remain soluble in one of these phases or may be present as a third phase in such small quantities and grain size that they are not noticeable in a magnified cross section at 100×, for example. A cross section (etched with KOH solution, for example) shows large areas of tin grains and smaller areas of silver-rich grains.

Figure 8:
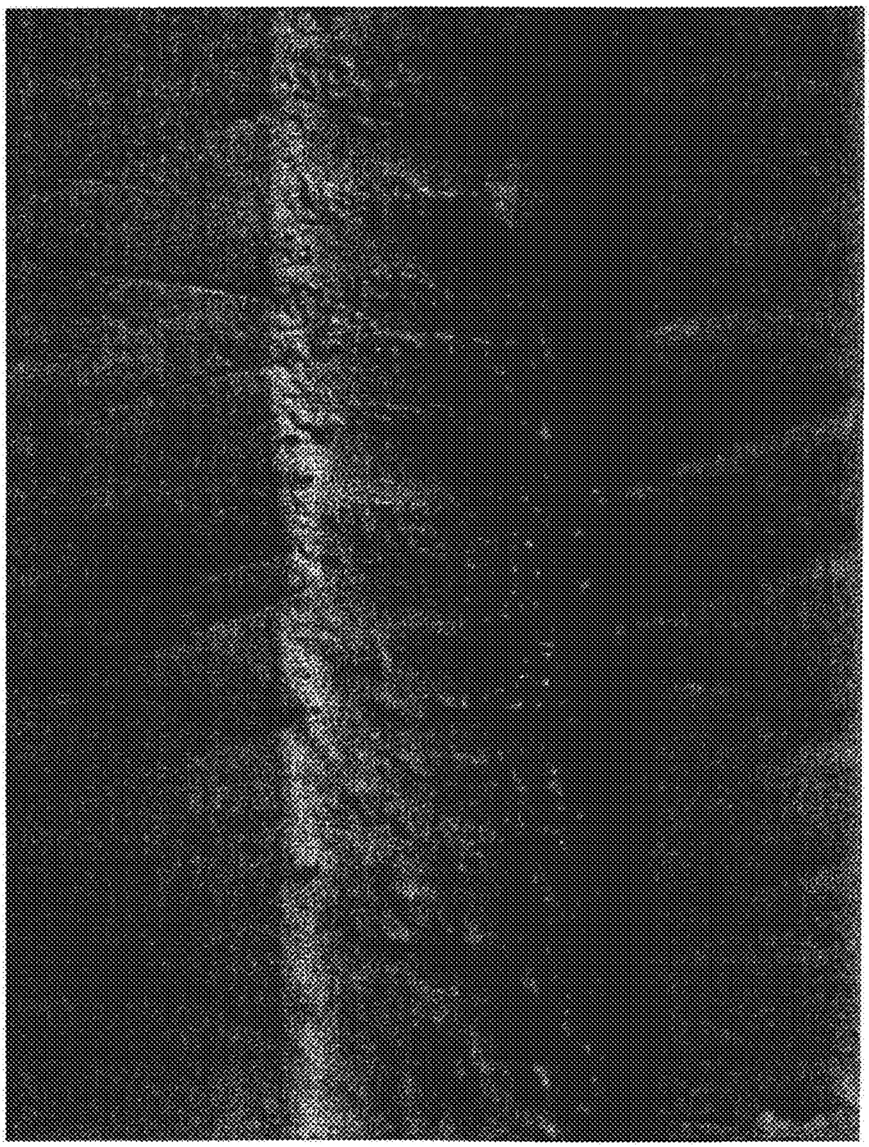
Figure 9:
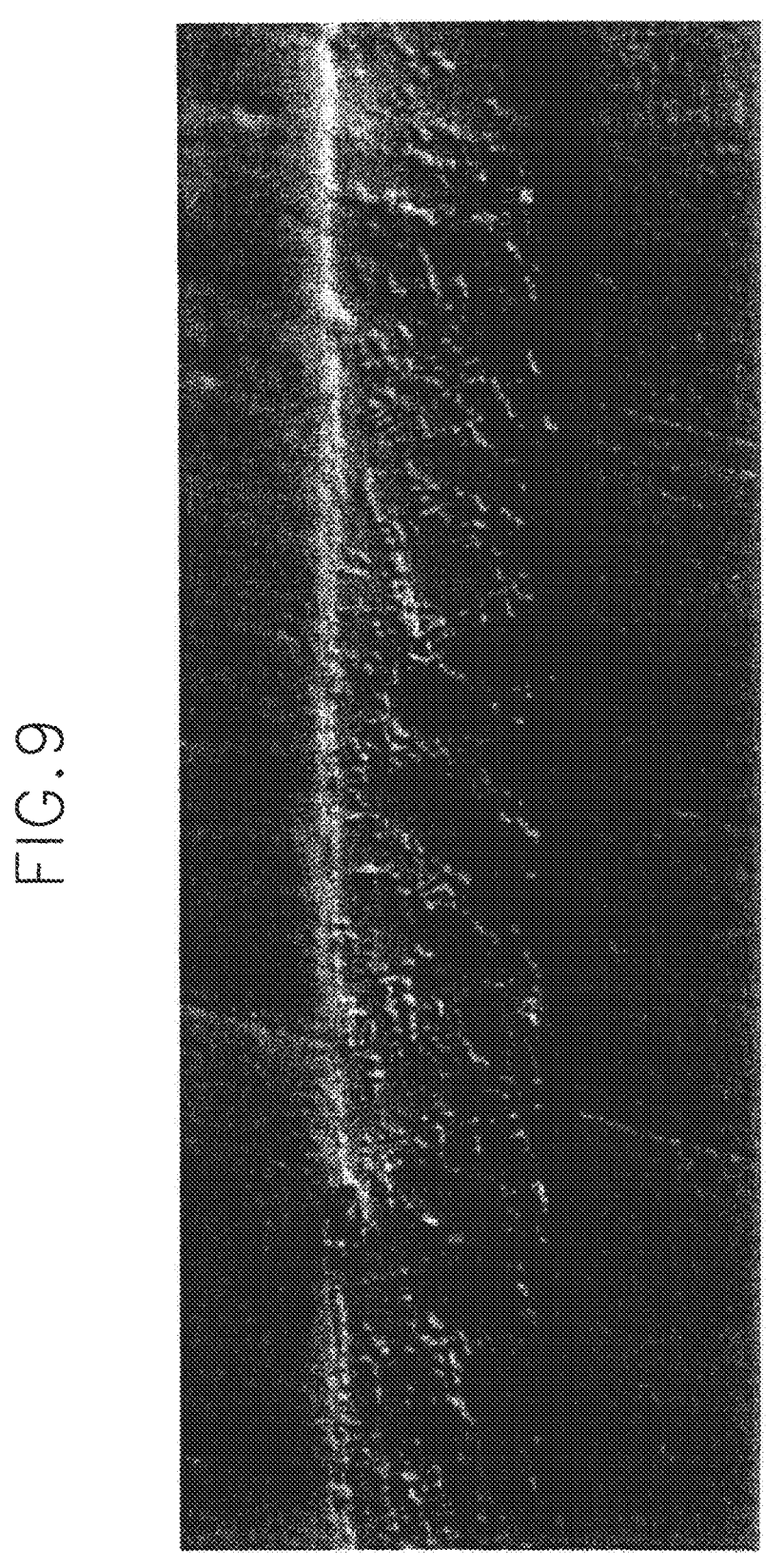

When the solder comes from a bath without an active additive layer, the tin-rich grains tend to be somewhat elongated or non-symmetrical. When the solder comes from a bath with an active additive layer, the tin-rich grains are more rounded or symmetrical. The differences have not been quantified, but are readily observed by an experienced operator. FIG. 8 illustrates in magnified cross section a representative solder joint formed by wave soldering with lead free solder from a bath without the use of a layer of active additive floating on the molten solder bath. FIG. 9 is a similar cross section of a representative solder joint formed at by the same technique with a layer of active additive floating on the molten solder bath.

These visual observations of the surface and grain structure of solder with and without use of active additive in the process are “averages”. In other words, an observation of one joint or cross section may not clearly indicate whether a joint was made with or without active additive. An individual joint may be ambiguous, although other times even a single joint is enough to distinguish processes with and without active additive. When a group of joints made by one process are examined, use or non-use can be distinguished.

An aspect of this invention comprises minimizing formation of dross on molten solder. When molten solder is exposed to air, there is oxidation of the metal. These oxides (usually called dross) form on the surface and accumulate during operation of a continuous soldering apparatus, such as wave soldering machine. There are several problems associated with dross formation.

Dross can interfere with sound soldering of printed circuit boards. For example, in severe situations it may inhibit wetting of the surfaces to be soldered and result in poor or incomplete joints. The presence of dross is also implicated in bridging of solder between closely spaced electrical leads or connection pads. When dross accumulates in a continuous soldering apparatus, it is sometimes necessary to shut down the operation of the machine and manually ladle floating dross from the surface. Even if ladled from the solder bath during continuous operation, dross removal involves clear hazards around molten solder. Furthermore, the dross is a waste of the solder, and the metal removed as dross must be replaced. With lead-tin solders, dross is a hazardous waste.

It is found that when an active additive layer is added to a surface of the molten solder in wave soldering apparatus, for example, the formation of dross is diminished. The presence of a film of active additive on surfaces exposed to air apparently serves to block air from reaching the metal surface and thereby inhibits oxidation. Additionally, the active additive scavenges metal oxides from the bulk of the solder bath.

Dross that may form on exposed areas of the molten solder surface is assimilated into the active additive layer. Dross formed on a solder bath typically includes metal oxide and entrained solder metal when the dross forms in absence of an active additive. As much as ¾ or more of the dross may be in the form of entrained solder. In practice of this invention, it appears that the metal oxide portion of dross is retained in the additive layer and metallic portions entrained in dross (if any) are restored to the bath, so that the total amount of solder lost into dross is greatly diminished. It does not appear that any appreciable amount of unoxidized metal is entrained in the active additive. Thus, less solder is consumed during soldering and costs are thereby reduced since less waste is produced.

It is found that metal-containing dross can be heated in contact with active additive and entrained metal in the dross is released as metal oxide is assimilated in the additive. Thus, dross removed from a solder pot in wave solder apparatus, for example, when no active additive is used, may be skimmed off and processed to recover solder. The dross is heated above the melting point of the solder under a layer of active additive. The layers may be stirred for enhanced contact to speed processing. A pool of molten solder forms and/or grows under the additive layer and the remainder of the dross is assimilated by the liquid additive.

The active additive with assimilated oxidized metal may be roasted for recovering tin and other metals (e.g. silver). Some tin ores are commonly roasted in coal-fired or oil-fired fire-brick-lined rotary kilns (or reverberatory furnaces) at up to 650° C. preparatory to eliminating impurities. The metal laden additive may be used as some of the input fuel or simply added to the ores and burned in the kiln. An oxidizing roast is employed since a reducing roast can yield undesirable smoke and tin oxide is the most common form of the metal in tin ores. A chloridizing roast (with NaCl) in oxidizing conditions may be used to separate tin from silver, which is recovered as fume.

Although it is believed that at least a mono-molecular film forms over quiescent parts of the exposed surface of the molten solder, it is likely that areas of solder surface in a dynamic or turbulent situation are not completely covered with such a film. Thus, where there is considerable turbulence (such as where a wave falls to the surface of the bath of solder in the bath) or rapid flow (such as on part of a wave), a continuous film may not exist. Even if the film is not continuous throughout the surface, it is beneficial in minimizing dross formation as well as continually scavenging metal oxides from the bulk of the solder bath.

Oxidation to form dross may require nucleation sites to form dross that would interfere with soldering. By removing most of the oxide and isolating it from locations where dross interferes, nucleation sites are diminished and dross formation is likewise reduced. In other words, dross continues to be formed, but a lower rate. What dross does form is captured and assimilated by the active additive and removed from harm's way. Furthermore, the situs of dross formation may be shifted from where it would be detrimental to locations where it is more readily captured.

At a minimum, the addition to the solder bath should be sufficient to maintain a substantially continuous film on a quiescent surface of the molten solder. No detriment has been recognized from having excesses of the additive beyond what is required to maintain a continuous film. Apparently, the active additive does not form a continuous layer on turbulent or significantly dynamic areas of the surface such as on the wave in a wave soldering apparatus or where the wave falls onto the quieter areas. Dross can be seen forming in such non-quiescent areas, but the dross is assimilated into the active additive upon contact.

It has been found desirable to add enough active additive to the surface of a solder pot in wave soldering apparatus to form a floating layer of appreciable thickness, e.g. about ¼ to 1 cm on at least a portion of the surface of the bath. This amount permits the apparatus to be operated for a day or more before bath maintenance (except for adding solder to replace that used on the PC boards). The layer forms a barrier which prevents oxidation of the solder in the bath. Small amounts of oxidation occur on the surface of the wave and these bits of floating oxide "waterfall" back toward the bath. Such new metal oxide is promptly assimilated by the floating layer and essentially disappears.

How thick a layer of active additive to place on a bath is somewhat dependent on the volume of the solder in the bath. An important function of the active additive is to scavenge metal oxide from the molten solder. Thus, instead of being determined mainly by surface area, the amount of solder is a better measure of the amount additive to be used on a bath. As an order of magnitude, about 100 ml. of active additive appears appropriate per 100 kg. of solder. That is more than enough for initial scavenging and permits continued operation of the bath for an extended time. After a bath has been cleaned of oxides in the molten metal, volume is less significant and the amount of additive maintained on the bath is related more to surface area and to turbulent activity that exposes metal to air so that oxides form.

A dimer acid when added onto a bath is nearly water-white clear. The layer gradually darkens as metal oxide is assimilated by the organic additive. The layer gradually takes the appearance of tea, milky tea, cocoa, coffee with cream and black coffee. It is believed that the darkening is partially due to degradation of the organic material and partially due to assimilating metal oxide. Degradation may be due to polymerization, decomposition or oxidation, and possibly involves all of these processes. A darkened "gummy" layer forms and when skimmed off, at least a film of active additive typically remains on a quiescent surface of the molten metal, and continues to be effective in assimilating metal oxide, barring contact of air and the metal surface and maintaining low amounts of oxide in the metal.

When the active additive layer is on a dynamic bath, such as in a wave soldering apparatus, such darkening occurs, but apparently at a lower rate than on a quiescent bath. The layer of organic liquid on the bath remains on quieter areas of the bath, but may be pushed away from the turbulent region where the wave falls into the bath. As the active layer darkens its viscosity seems to increase so that it gradually advances toward the foot of the wave, and may eventually encounter the metal flowing off the top of the wave.

Upon "resting" on a quiescent bath for a period after a wave is turned off, for example, a gummy dark layer may separate and when this is removed a layer of active additive remains beneath it. It is believed that the degraded material is merely stirred into the active material in such a way that it is not visually observed as a distinct layer. It can be desirable to intermittently remove degraded or spent material.

Although the active additive remains as a liquid on the bath even after degraded, it may include dispersed solids. The gummy material is not readily separated to see if there are solids present, but it does appear that metal oxide particles are dispersed in the additive. After about five hours of operation of a small laboratory scale wave solder apparatus (which generates dross much more rapidly than in commercial scale apparatus) it was found that a gummy liquid removed from the bath was about 70% by weight metal oxide solids. Although viscous and a solid crust may form in areas, the additive continues to behave as a liquid, albeit quite viscous, at the temperature of the bath. It is also found that effectiveness of the additive can be maintained by adding fresh active additive even after it becomes quite viscous. When the additive is left on the bath for an extended period (for example, overnight) with the wave turned off, a thin crust of degraded material forms on the surface.

When quite dark and gummy, effectiveness of the additive may be diminished and the entire visible layer of organic material may be removed from the bath. One easy removal technique is to add a powdered absorbing agent to the liquid and vacuum it off the surface of the bath when visible liquid is no longer seen. Absorbing agents of the sort commonly used for soaking up fuel or motor oil spills, or even absorbent kitty litter are effective. Such an agent is mixed with finely divided diatomaceous earth or silica gel; about a 50-50 mixture for good effectiveness. The proportions are not critical and 25-75 to 75-25 mixes have been found acceptable.

The degraded active additive layer may also be removed by a high temperature resistant "sponge". For example, after the production scale operation described above, a piece of aramid fiber (Kevlarm) woven fabric about three inches by eight inches was placed on the surface. The tight weave fabric was up to ¼ inch thick. Degraded material wetted the aramid and was soaked into the fabric. The floating patch of fabric was pushed around the surface to pick up additive along the edges of the pot, and when lifted off, it was found that almost all of the visible additive layer was removed with the patch. Downtime for removing the degraded additive and replacing it with fresh was about three to four minutes, certainly less than five minutes.

It has been found that a costly aramid fiber "sponge" is not essential. Degraded active additive has been successfully removed from a bath of molten solder by swabbing with an ordinary cotton terry cloth towel. The rag is not in contact with the solder enough to sustain appreciable damage or leave any residue on the bath. Thus, an inexpensive cotton rag or other fiber wetted by the active additive can be used for removing spent additive.

It can be noted that in some commercial scale apparatus dross is removed from the solder pot about once per shift. When a suitable active additive is applied it appears that removal of spent material is desirable only about once per day. In other words, operating time between surface cleanings is roughly tripled.

After a period of use some of the viscous, tar-like additive on a solder pot may adhere to walls of the pot or other surfaces and be somewhat hard to remove. Thus, it may be desirable for long term usage to add and remove active additive or the like without forming free floating visible layers of the liquid on the surface of the molten solder. This may be accomplished by containing a principal portion of the active additive layer in a “tea bag” which is placed on the bath and can be lifted off when effectiveness is diminished. The visible layer of additive is contained within the bag and additive sufficient to form at least a monolayer of additive over a quiescent surface of the bath can pass through pores in the bag.

Figure 6:
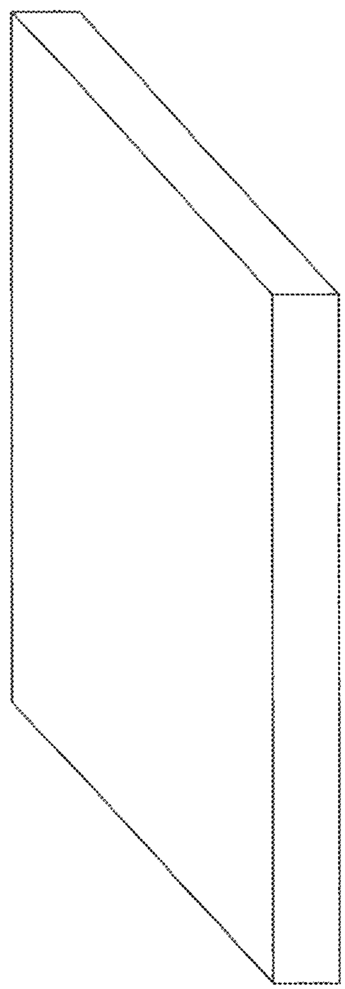
FIG. 6 illustrates a "bag" for additive for a solder bath.

An exemplary “tea bag” or permeable envelope for containing additive is illustrated in FIG. 6. A simple hollow envelope of fine mesh material contains active additive. The mesh may be metal that is not readily wetted by solder in the bath or may be a high temperature plastic such as aramid resin (melting point about 500° C., e.g. Kevlarn9. The pore size in the mesh is only small enough to avoid large amounts of the liquid additive from leaving the bag and is large enough to allow contact of the additive with solder for scavenging oxides and assimilating any dross that forms. The bag need not be rectangular as shown and may be made simply by sealing or stitching edges of a couple flat sheets with additive therebetween. A complex shape may be used to provide convolutions along the edges floating at the surface of the bath for increasing the surface area through which additive and/or metal oxide can pass.

Since the effectiveness of active additive layer on the molten solder in a continuous soldering apparatus may be degraded or depleted during use, it may be desirable to replace the substance at about the same rate it is depleted. This may be accomplished by intermittently manually swabbing off or aspirating some of the active additive and adding a small amount of the substance to the solder bath to maintain an effective layer. Alternatively, this may be automated to intermittently or periodically add remove and add small amounts of the substance during operation of the apparatus.

When the active additive is a viscous liquid (as is often the case), it can be readily dispensed (drop wise, for example) by any of a variety of available liquid dispensers. The viscosity may be reduced by use of suitable solvents such as toluene, hexane, octane, isopropyl alcohol, butyl alcohol, hexanol or the like. The desired rate of renewal of the layer is readily found empirically. Spent or degraded additive may be removed by automated “swabbing” with an aramid sponge as described above, or liquid may be aspirated off the surface.

Particularly useful materials for changing the rheology of a dimer acid or similar active additive are fatty acid monomers or short chain esters (e.g. a methyl butylate or dibutylate ester). For example, a C8 carboxylic acid may serve a dual function of reducing viscosity of a dimer acid and capturing metal oxide that would otherwise appear in troublesome dross. Such shorter carboxylic acids may be found in the low end distillates from tall oil or other organic fatty acid mixtures. Palm oil or the like may reduce viscosity enough to be practical in some applications. Esters with carbon numbers of C8, C10, C12 and the like may be used when they have reasonably low vapor pressure at room temperature and suitably modify the rheology of the active additive. Perfluorinated fatty acids and the like may also be used for modifying rheology of the active additive. Low molecular weight adjuvants may vaporize or oxidize rapidly upon addition onto a molten solder bath. It is desirable to avoid much use of adjuvants that are smoky or emit unpleasant or noxious fumes.

The active additive may be diluted with essentially ineffective ingredients without destroying effectiveness. Substantial dilution may reduce the time the active ingredient remains effective or accelerate the need to remove degraded material. For example, a small amount of carnauba wax (up to about 1%) has been added to a dimer acid to produce a rather pleasant odor when heated. A ten percent dilution with carnauba wax did not significantly reduce effectiveness or lifetime. A dilution to about 70% dimer acid and 30% wax noticeably reduced useful life, but did not seem to reduce effectiveness. Useful life was reduced since the mixture got dark and gummy quicker than undiluted dimer acid. Thus, the liquid layer on the molten solder preferably has a major portion of the active additive, i.e., more than about 50%. One may also add coloring agents to the active additive without detriment.

A characteristic of the active additive is that it “assimilates metal oxide” from the molten metal or dross, or “assimilates oxide of at least one metal in the bath”. This is intended to encompass assimilating metal in its oxidized state. It is not known exactly how the “metal oxide” is retained in the active additive layer. It is not known whether metal oxide is substituted in a molecule or entrapped in the additive, and it may be both. There may be chelating, sequestering, reaction, or simply surrounding. For example, if a reactive group on the active additive is an amine, the metal ion may attach to the additive molecule and release water. The active additive scavenges and assimilates metal oxide since it has a greater affinity for metal oxide than does the molten metal.

Thus, active additive on molten solder and used in continuous solder apparatus may gradually degrade by saponification in the course of eliminating metal oxides. There can be covalent or dative (coordinate) bonding between the organic additive end group(s) and a metal oxide. Most likely, micelles of the active additive effectively entrap oxides. In effect, a number of molecules of the organic liquid encompass a molecule or group of molecules of metal oxide. Such assimilation of the metal oxide leaves the additive as a liquid, although the viscosity may be increased (viscosity of the liquid has not been quantitatively measured and that is nearly meaningless since viscosity seems to gradually increase). Metal oxide may not be assimilated as distinct stoichiometric molecules, and that is not important. There may be “oligomers” of metal oxide with loose bonding of a few apparently stoichiometric molecules.

It is possible that active additives with nucleophilic or electrophilic end groups are forming “heavy metal soaps” in the heat of the molten solder alloy. These soaps are structures where the carboxyl group is complexed to a metal ion, for example, tin, at an end of an aliphatic chain, for example. When carboxylic end groups are present, tin may substitute for hydrogen in the —COOH group (two such groups for divalent tin). Evidence for this is the presence of tin detected in the dimer acid used on a solder bath.

An exemplary reaction is

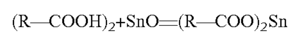

$$(R—COOH)_2+SnO=(R—COO)_2Sn$$

where $(R—COOH)_2$ represents the dimer acid. When tin has a valence of four as in $Sn0_2$ the product is $(R—COO)_4Sn$ by combination of two dieters with the tin oxide. Like most salts, these heavy metal soaps have a high heat tolerance, which may help explain why the additive does not rapidly degrade in the harsh environment of the molten alloys.

If desired, one may improve heat tolerance by minimizing unsaturation in the active additive molecules. Decreasing unsaturation increases heat tolerance by encouraging tight molecular packing. Thus, for example, Sigma-Adrich product 432369, a hydrogenated dimer acid, may provide enhanced heat tolerance as compared with unsaturated counterparts. Furthermore, aromatic dimer acids or the like have enhanced thermal stability. Di-carboxy phenyl acids that are analogs of phthalic acid may be particularly useful.

Halogenated materials may be added to active additives for enhanced heat stability, such as nonadecafluorodecanoic acid or poly(dimethylsiloxane-co-dimer acid, bis(perfluorododecyl) terminated; Sigma-Aldrich products 177741 and 434906, respectively (Sigma-Aldrich Inc. of Madison, Wis.). Other dimer acid products from Sigma-Aldrich include their products 430307, 191043, 191035, 191019, 434647 and 434655.

The active additive is not behaving as a flux in the soldering process. The function of a flux in soldering is to remove the oxide film from the base metal by reacting with or otherwise loosening that film from the base metal surface. The molten flux then forms a protective blanket in the vicinity of the joint which prevents re-formation of the oxide film until molten solder displaces the flux and reacts with the base metal to form an intermetallic bond. The relationship among solder, base metal and flux is such that a flux that is optimum for one solder composition is not necessarily the best flux for a different composition. The active additive is scavenging metal oxide from the molten solder and may never contact the solid surfaces to be soldered. Flux may also be used on the solid surfaces to facilitate soldering during practice of this process. Fluxing action is a separate, independent function.

When using a layer of additive on a solder bath in a wave soldering apparatus, for example, the PC boards being soldered typically have a conventional flux added to the surface before contacting the wave of molten solder. Some fluxes contain rosin acid and/or fatty acids such as listed in *Metals Handbook*, (9th Edition, Vol. 6, *Welding, Brazing and Soldering*, page 1082). Such fatty acid fluxes are not suitable for forming a layer of additive on a molten solder bath for a number of reasons, the most cogent being stability at the temperature of the bath. Dimerized rosin is used in fluxes and is found insufficiently stable for cleansing a solder bath. Many such materials emit noxious fumes or smoke when maintained at bath temperatures.

Active additive is not believed to be present on the top of the wave of solder in a wave soldering apparatus, for example, since the molten solder in the wave is pumped from the bottom of the bath, far below the floating layer of additive. The additive is neither soluble in nor easily dispersed in the metal. Although active additive readily and quickly spreads to form at least a monomolecular film on the surface of the molten metal, it is not believed capable of rapidly "climbing" the wave to contact the PC boards or the like being soldered. Such a layer forms in quiescent areas of the bath and a continuous film is not believed present in turbulent areas. No residue of additive has been found on boards wave soldered when the bath has a layer of dimer acid on the surface.

The substance added to the solder in a continuous process may be added continually, such as intermittently or periodically, and continuous addition is not believed to be needed. It also appears adequate to intermittently remove spent liquid residues (including dross) from the surface of the solder and where this is done repeatedly, there is, in effect, continual removal. If desired, removal of spent residues may be automated so that it becomes more nearly continuous.

As noted above, dimer acid and/or trimer acid suitable for use in practice of this invention is not necessarily pure dimer of one fatty acid. An example has been given of a dimer acid which includes small amounts of monomer and trimer. What could be termed a "trimer acid" having a substantial proportion of trimer of fatty acids, may be suitable. Thus, for example, a trimer acid having about two-thirds trimer and one-third dimer may be quite satisfactory, particularly if the fatty acid(s) used to make the trimer have small carbon numbers. A predominantly trimer acid composition with suitable carbon number may be preferable to a predominantly dimer acid composition, since it is suggested that a trimer acid degrades more slowly than a dimer acid.

Dimer acids and trimer acids effective in a soldering process can be made from fatty acids having about 18 carbon atoms, including the carbon in the carboxyl group. Readily available fatty acids from vegetable sources generally have an even number of carbon atoms. A number of C18 fatty acid monomers are mentioned above. An example of a C16 fatty acid monomer is palmitic acid. Since they are easily available and inexpensive, dimer acids made from fatty acids with carbon numbers ranging from about C14 to C22 are preferred. Dimer and/or trimer acids with higher carbon numbers are probably suitable for some soldering applications but are not readily commercially available. They may also be useful on zinc baths used for dip galvanizing.

When the carbon number is lower than about twelve, it is believed desirable to employ trimers or higher polymers or dendrimers to achieve adequate carbon moiety lengths for good film forming properties and assimilation of metal oxides. Thus, it is preferred that the dimer acid or equivalent have a carbon number in the range of from about 24 to 60. Best results seem to be available with dimer acid with a carbon number in the range of from about 28 to 44. When speaking of carbon number it will be recognized that this is commonly an "average" for the dimer acid or the like since such materials are commonly a mixture of dimers of different fatty acids and may include monomers, trimers and dendrimers with higher and lower carbon numbers. Dendrimers may be particularly useful since there can be several reactive sites without diminishing other desirable properties of the additive.

The process of scavenging metal oxide from a solder bath is particularly effective with lead-free solders. It is suitable for conventional lead-tin solders, but subjectively seems to offer fewer advantages. It has been found that an active additive is more effective on a bath of lead-free solder than on a lead-tin solder alloy bath.

A "skin" of dross can sometimes be seen on the surface of a wave in wave soldering apparatus, for example. The skin travels across the surface of the solder pot until it reaches the active additive, whereupon it is assimilated into the additive. It is not known if this dross includes entrained metal or is largely oxidized metal. If there is metallic solder in the dross, it is released and returns to the solder bath as oxidized metal is assimilated in the additive.

A much more visible layer is formed on the dynamic wave in a lead-tin solder bath than on a lead-free solder bath. This is believed to be a dynamic effect as lead oxidizes more readily or rapidly than tin in the conditions of soldering apparatus. (An analogy may occur at room temperature. A surface of lead becomes dull grey as a layer of visible oxide forms. A surface of tin, on the other hand, remains shiny and metallic appearing. This is believed due to formation of a thin, transparent layer of tin oxide that passivates the tin surface and inhibits further oxidation.) The high density of lead and its compounds may also play a role. A skin of lead-containing oxide may push further across a quiescent surface toward the active additive than a similar skin of lead-free oxide. A layer of active additive on a lead-free solder bath appears homogeneous even after assimilating appreciable oxidized metal. A dispersion of what appear to be fine particles may be seen in lower parts of an active additive layer on a lead-tin solder bath. Only slight stirring is sufficient to disperse the particles throughout the layer of additive so that it appears homogeneous. It may also occur that the active additive "wets" a high tin, lead-free molten solder surface than it does a surface of lead-tin solder. This could result in less area on the lead-free solder which is not covered by a thin layer of the additive, and therefore, is less exposed to air.

Use of an active additive is particularly appropriate for tin-silver solders and tin-based ternary solder alloys, including, for example, tin-silver alloys with additions of copper, nickel, bismuth, antimony, zinc and/or indium. It is also effective for "pure" tin baths. So far as is known, the soldering process is also independent of the solder apparatus in which it is used.

Although described in context of wave soldering of PC boards with components in place, the invention is also useful for pre-tinning PC boards or component leads and other soldering processes. For example, freshly manufactured PC boards have conductive areas coated with solder by contact of the board with molten solder, somewhat the same way as in a wave solder apparatus. A blast of hot air is then used to blow away excess solder on contact pads and even from plated-through holes. The technique for preparing PC boards is called Hot Air Solder Leveling (HASL). This pre-tinning is used to protect the copper leads from oxidation during the interval between making of the board and mounting components on the board, as well as to facilitate soldering of components in place. Pre-tinning of component leads with solder is for similar purposes.

In addition to soldering PC boards and the like, a soldering process as described herein may be employed for other products. For example, automotive radiator cores are often soldered by dipping the cores in a bath of molten solder. A layer of active additive on the bath facilitates such soldering. Costume jewelry and other products are often soldered and the process is suitable for such uses, as well.

Dross is a troublesome issue when tin plating steel, manufacturing float glass, making bullets or lead shot, making toy figurines and other processes involving molten metals, and solving such problems by use of this invention is also feasible. When the active additive is suitably resistant to elevated temperatures, the process may be used for hot dip galvanizing. Such an active additive may be a trimer or aromatic compound, for example, and may be solid at room temperature without departing from principles of this invention. Other uses for such a process will be apparent to those skilled in the art.

Following are the Tables referred to above.

TABLE I

Monomeric fatty acids, relative and absolute amounts

| Monomers | % of monomers | Amount in sample |
|---|---|---|
| Stearic | 48% | 2.9% |
| Oleic | 43% | 2.6% |
| Linoleic | 9% | 0.5% |
| Total | 100% | 6% |

TABLE II

Dimeric fatty acids, relative and absolute amounts

| Dimers | % of dimers | Amount in sample |
|---|---|---|
| oleic-stearic | 3% | 2.7% |
| oleic-oleic | 18% | 16.0% |
| linoleic-oleic | 46% | 40.9% |
| linoleic-linoleic; linolenic-oleic | 14% | 12.5 |
| linolenic-linoleic | 9% | 8.0 |
| linolenic-linolenic | 8% | 7.1 |
| mass 276-linolenic | 3% | 2.7% |
| Total | 101% | 90% |

TABLE III

Trimeric fatty acids, relative and absolute amounts

| Trimers | % of trimers | Amount in sample |
|---|---|---|
| oleic-oleic-oleic | 14% | 0.7% |
| oleic-oleic-linoleic | 46% | 2.3% |
| oleic-linoleic-linoleic | 26% | 1.3% |
| linoleic-linoleic-linolenic | 13% | 0.7 |
| Total | 99% | 5% |

What is claimed is:

1. A method of processing dross to recover molten solder entrained therein, comprising:

(i) removing dross from a solder-bath, wherein the dross comprises entrained solder, (ii) placing the dross from (i) in a receptacle, (iii) adding a liquid active additive comprising dimer acid to the receptacle containing the dross to form a dross-active additive mixture, wherein the dimer acid (a) has a carbon number in the range of about 24 to 60, and (b) is a dimerized saturated or unsaturated fatty acid; and (iv) heating the dross-active additive mixture from (iii) above the melting point of the solder to thereby assimilate dross in the liquid active additive and release molten solder from the dross.

2. The method of claim 1, wherein the dross-active additive mixture is stirred during heating.

3. The method of claim 1, whereby as a result of heating, a pool of released molten solder forms under a layer of the active additive.

4. The method of claim 1, wherein the liquid active additive further comprises trimer acid, wherein the trimer acid is a trimer of a saturated or unsaturated fatty acid having a carbon number ranging from 14 to 22.

5. The method of claim 1, wherein the liquid active additive comprises a major portion of dimer acid.

6. The method of claim 1, wherein the dimer acid is saturated.

7. The soldering apparatus of claim 1, wherein the dimer acid is unsaturated.

8. The method of claim 1, wherein the dimer acid comprises a mixture of dimer acids.

9. The method of claim 1, wherein the entrained solder comprises a lead-tin mixture.

10. The method of claim 1, wherein the entrained solder is a lead-free solder.

11. The method of claim 1, wherein the released molten solder is recovered.

12. The method of claim 1, wherein the removing step comprises skimming dross off of the surface of a solder bath.

13. The method of claim 1, further comprising recovering and subsequently roasting the liquid active additive comprising assimilated dross.

* * * * *